US012641361B2

(12) United States Patent
Orth

(10) Patent No.: US 12,641,361 B2
(45) Date of Patent: May 26, 2026

(54) SUBWOOFER PHASE ALIGNMENT CONTROL SYSTEM AND METHOD

(71) Applicant: Sound United, LLC, Carlsbad, CA (US)

(72) Inventor: Scott Orth, Laurel, MD (US)

(73) Assignee: SOUND UNITED, LLC, Carlsbad, CA (US)

( * ) Notice: Subject to any disclaimer, the term of this patent is extended or adjusted under 35 U.S.C. 154(b) by 233 days.

(21) Appl. No.: 18/336,623

(22) Filed: Jun. 16, 2023

(65) Prior Publication Data

US 2023/0336911 A1 Oct. 19, 2023

Related U.S. Application Data

(63) Continuation of application No. PCT/US2021/064162, filed on Dec. 17, 2021.

(60) Provisional application No. 63/127,073, filed on Dec. 17, 2020.

(51) Int. Cl.

| | |
|---|---|
| ***H04S 7/00*** | (2006.01) |
| ***H04R 1/24*** | (2006.01) |
| ***H04R 3/04*** | (2006.01) |
| ***H04R 3/12*** | (2006.01) |

(52) U.S. Cl.

CPC ................. *H04R 1/24* (2013.01); *H04R 3/04* (2013.01); *H04R 3/12* (2013.01); *H04S 7/307* (2013.01)

(58) Field of Classification Search

CPC ........................................................ H04S 7/307
USPC ............................................................ 381/97
See application file for complete search history.

(56) References Cited

U.S. PATENT DOCUMENTS

| | | | | |
|---|---|---|---|---|
| 6,741,273 | B1 * | 5/2004 | Waters | H04S 7/302 381/307 |
| 8,194,874 | B2 | 6/2012 | Starobin et al. | |
| 8,995,697 | B2 | 3/2015 | Gladwin et al. | |
| 9,374,640 | B2 | 6/2016 | Starobin | |
| 2003/0214359 | A1 * | 11/2003 | Sasho | H03F 1/3223 330/310 |
| 2006/0088174 | A1 * | 4/2006 | DeLeeuw | H04S 7/301 381/59 |
| 2007/0025559 | A1 | 2/2007 | Mihelich et al. | |
| 2007/0253575 | A1 | 11/2007 | Melanson | |
| 2009/0273404 | A1 * | 11/2009 | Hay | H03B 5/326 331/107 A |
| 2011/0274286 | A2 | 11/2011 | McCarty et al. | |

(Continued)

FOREIGN PATENT DOCUMENTS

| | | |
|---|---|---|
| JP | H02-13097 | 1/1990 |
| JP | H04-368097 | 12/1992 |

(Continued)

OTHER PUBLICATIONS

Translation of Japanese Publication No. H0622388A, Jan. 28, 1994 (Year: 1994).*

(Continued)

*Primary Examiner* — Katherine A Faley

(57) ABSTRACT

A multi-speaker (e.g., home theater or stereo) audio system 200 with one or more subwoofers includes improved phase-adjustable subwoofers 222 and an improved subwoofer phase control method allows the user to quickly and accurately select the most satisfying subwoofer phase adjustments for blending the subwoofer's output with the remainder of the system's speakers' output.

25 Claims, 7 Drawing Sheets

(56) References Cited

U.S. PATENT DOCUMENTS

| | | | | |
|---|---|---|---|---|
| 2015/0350786 | A1 | 12/2015 | Capp et al. | |
| 2020/0092667 | A1* | 3/2020 | Wolff | H04R 29/002 |

FOREIGN PATENT DOCUMENTS

| | | |
|---|---|---|
| JP | H06-22388 | 1/1994 |
| JP | 2007-507177 | 3/2007 |
| WO | WO 2005/032206 | 4/2005 |
| WO | WO 2020/175175 | 9/2020 |

OTHER PUBLICATIONS

International Search Report for PCT/US2021/064162 dated May 23, 2022, pp. 1-4.
Written Opinion of the International Searching Authority for PCT/US2021/064162 dated May 23, 2022, pp. 1-9.
Extended European Search Report for European Patent Application No. 21907940.7, dated Feb. 27, 2025.
Office Action for Japanese Patent Application No. 2023-562632, dated Aug. 1, 2025.

* cited by examiner

250

| Polarity positive (non-inverted) | | User-selected Phase Correction | | | |
|---|---|---|---|---|---|
| | | -135° | -90° | -45° | 0° |
| Cut-off Frequency | 40Hz | 16.568Hz | 40Hz | 96.568Hz | Bypass |
| | 45Hz | 18.639Hz | 45Hz | 108.639Hz | |
| | 50Hz | 20.71Hz | 50Hz | 120.71Hz | |
| | 55Hz | 22.781Hz | 55Hz | 132.781Hz | |
| | 60Hz | 24.852Hz | 60Hz | 144.852Hz | |
| | 65Hz | 26.923Hz | 65Hz | 156.923Hz | |
| | 70Hz | 28.994Hz | 70Hz | 168.994Hz | |
| | 75Hz | 31.065Hz | 75Hz | 181.065Hz | |
| | 80Hz | 33.136Hz | 80Hz | 193.136Hz | |
| | 85Hz | 35.207Hz | 85Hz | 205.207Hz | |
| | 90Hz | 37.278Hz | 90Hz | 217.278Hz | |
| | 95Hz | 39.349Hz | 95Hz | 229.349Hz | |
| | 100Hz | 41.42Hz | 100Hz | 241.42Hz | |
| | 110Hz | 45.562Hz | 110Hz | 265.562Hz | |
| | 120Hz | 49.704Hz | 120Hz | 289.704Hz | |
| | 130Hz | 53.846Hz | 130Hz | 313.846Hz | |
| | 140Hz | 57.988Hz | 140Hz | 337.988Hz | |
| | 150Hz | 62.13Hz | 150Hz | 362.13Hz | |

| Polarity negative (inverted) | | User-selected Phase Correction | | | |
|---|---|---|---|---|---|
| | | 45° | 90° | 135° | 180° |
| Cut-off Frequency | 40Hz | 16.568Hz | 40Hz | 96.568Hz | Bypass |
| | 45Hz | 18.639Hz | 45Hz | 108.639Hz | |
| | 50Hz | 20.71Hz | 50Hz | 120.71Hz | |
| | 55Hz | 22.781Hz | 55Hz | 132.781Hz | |
| | 60Hz | 24.852Hz | 60Hz | 144.852Hz | |
| | 65Hz | 26.923Hz | 65Hz | 156.923Hz | |
| | 70Hz | 28.994Hz | 70Hz | 168.994Hz | |
| | 75Hz | 31.065Hz | 75Hz | 181.065Hz | |
| | 80Hz | 33.136Hz | 80Hz | 193.136Hz | |
| | 85Hz | 35.207Hz | 85Hz | 205.207Hz | |
| | 90Hz | 37.278Hz | 90Hz | 217.278Hz | |
| | 95Hz | 39.349Hz | 95Hz | 229.349Hz | |
| | 100Hz | 41.42Hz | 100Hz | 241.42Hz | |
| | 110Hz | 45.562Hz | 110Hz | 265.562Hz | |
| | 120Hz | 49.704Hz | 120Hz | 289.704Hz | |
| | 130Hz | 53.846Hz | 130Hz | 313.846Hz | |
| | 140Hz | 57.988Hz | 140Hz | 337.988Hz | |
| | 150Hz | 62.13Hz | 150Hz | 362.13Hz | |

Fig. 5

SUBWOOFER PHASE ALIGNMENT CONTROL SYSTEM AND METHOD

REFERENCE TO RELATED APPLICATIONS

For background and nomenclature purposes, this application is related to the following commonly owned patent applications:

(a) Ser. No. 12/153,623, filed May 21, 2008 (now U.S. Pat. No. 8,194,874), (b) Ser. No. 13/162,294, filed Jun. 16, 2011 (now U.S. Pat. No. 8,995,697), (c) Ser. No. 14/563,508, filed Dec. 8, 2014 (now U.S. Pat. No. 9,374,640), and (d) Ser. No. PCT/US20/24232, filed Mar. 23, 2020 (now WIPO Pub. WO2020/191401), the entireties of which are incorporated herein by reference.

This application is a continuation of PCT/US2021/064162 filed Dec. 17, 2021, which claims the benefit of priority of U.S. Provisional Patent Application No. 63/127,073 ("Subwoofer Phase Alignment Control Method and System") filed on Dec. 17, 2020. The entire contents of that PCT application and the US provisional application are also incorporated herein by reference and priority is claimed.

BACKGROUND OF THE INVENTION

Field of the Invention

The present invention relates to methods and circuits configured for use in subwoofer loudspeaker systems and their crossover networks.

Discussion of the Prior Art

Consumer audio systems often include one or more main or satellite speakers and one or more subwoofers which are positioned together in a listener's room, as illustrated in FIGS. 1A and 1B, which provide perspective and top plan views of a typical prior art surround sound system, as generally indicated at 10, located in a media space, or room 12. The illustrated system is a conventional Dolby® digital set-up having a home theater or other audio/video (AV) source 14, optionally including an Audio Video Receiver ("AVR") 15. System 10 also includes a left channel speaker 16, a right channel speaker 18, and center channel speaker 20, used with a subwoofer 22, all located in front of a primary seating area for listeners at a listening position or station 24 such as a sofa or chair. The system often includes a pair of left and right surround speakers 26 and 28 spaced from the sides of the listening station to provide a sense of spaciousness to sound radiated by the speakers, and providing ambient sounds for AV programs such as movies and concerts. Also included in the typical home theater system 10 are left and right back speakers 30 and 32 located generally behind and to the sides of the listening station to provide a more intense surround sound. The speakers preferably are arranged around a center line 34 passing through the AV unit 14 and the listening station 24. Subwoofer 22 is typically an "active" subwoofer system, meaning that within a single enclosure it includes an electrodynamic "woofer" or low frequency driver which is connected to an amplifier assembly that has a line level "SW" input (typically a single RCA female connector) as well as an array of input connections and user accessible controls (e.g., a cutoff frequency dial, a "+/– polarity" or "0 or 180 degrees" phase switch and an "auto on/off" enablement switch). Older "passive" subwoofers (often used in two channel "stereo" systems) had no internal amplifier and included a passive crossover circuit which divided signals below a selected cutoff frequency (e.g., 80 Hz) to a dual voice coil woofer driver and passed higher frequency signals to the Left and Right "main" speakers (e.g., 16 and 18).

With reference to FIG. 1C, a full range loudspeaker system 50 might be used as the main left and right speakers (16, 18) and typically consists of a low-frequency module or "subwoofer" section 58 and a satellite section 52 with mid-bass drivers 60, 62 (for which a passband is bounded by mid/upper-bass frequencies) and a tweeter 64 for extreme treble extending beyond the upper range of human hearing. Conventional "subwoofer—satellite" systems (whether embodied by a "powered tower"—a powered subwoofer married to a passive loudspeaker co-existing in a single enclosure (e.g., 50, as illustrated in FIG. 1C)—or an active soundbar-subwoofer system (e.g., a system 100, with soundbar 110 and separate subwoofer 130, as illustrated in FIG. 1D)) have been plagued by poorly controlled acoustic magnitude response over the subwoofer-"satellite" passband. Simply increasing or attenuating the subwoofer signal level evenly over its passband typically yields excessive or deficient subwoofer level through and above the crossover passband (see the typical ideal or theoretical frequency response plot of FIG. 1E, which shows receiver crossovers set to 80 Hz, plus a 2nd order Butterworth filter which models the natural high pass characteristics of the associated main LCR speakers (e.g., 16, 18 and 20) or soundbar 110).

Any stereo or home theater sound system (e.g., 10) including full range loudspeaker systems (e.g., 50 or 100) should preferably blend and balance the outputs of these sections for use in a listening space 12 and the subwoofer's bass signal is often difficult to adjust for a satisfactory blend with the mid-bass levels of the other speakers to achieve satisfactory spectral balance. Simply adjusting the subwoofer signal's gain or polarity over its entire passband introduces unfavorable consequences in terms of system spectral balance, where listeners complain of "chesty" midrange and "bloated" or "muddy" sound.

In typical modern home theater systems, the audio/video (AV) source 14 (optionally Audio-Video Receiver, AVR 15) includes internal crossover circuits which provide (a) high pass filtered or full range signals to the "main" LCR speakers (e.g., left 16, center 20 and right 18 speakers) or to a soundbar (e.g., 110) and (b) low pass filtered signals to one or more subwoofers or subwoofer sections (e.g., 22, 58 or 130). Typical prior art standalone subwoofers (e.g., 22 or 130), typically have internal crossovers and at least one amplifier with LFE inputs (i.e. for low frequency effects), and the user, upon placing the subwoofer in the room, can adjust the Low Pass filter cutoff frequency, amplitude or amplifier gain level and "polarity". These subwoofer adjustment controls have proven inadequate, meaning that for real users in real rooms, the overall system's sound often was perceived as "smeared" or weak, especially for lower frequencies in the octaves near the subwoofer's cutoff frequency.

Blending a subwoofer's acoustic output (e.g., from 22 or 130) in a system 10 within a room 12 is a very complex matter. The significant factors include:

1) Room acoustics (e.g., for room 12),

2) Distance to speakers (e.g., between subwoofer 22 and the LCR speakers 16, 18 and 20), 3) Number of other speakers (apart from the subwoofer), 4) Low frequency design of all of the speakers involved, 5) Amplifier/Receiver frequency response and phase response (e.g., for AVR 15), 6) Amplifier/Receiver filter slopes and frequency (e.g., in AVR 15), and 7) Other DSP (digital signal processing) adjustment tools or Room EQ (equalization) routines (e.g., whether AVR 15 includes room correction facilities such as the Audyssey™ MultiEQ™ DSP system.)

Adding more adjustments to the Subwoofer (e.g., 22, 58 or 130), when combined with all of the foregoing factors, can lead to user or installer confusion. The laws of entropy tell us that there are vastly more ways to get these variables to add up wrong than right. A problem with the crude subwoofer controls of the prior art is that the user cannot tailor the subwoofer's output to smoothly integrate the subwoofer's output with the remaining speakers' output when listening from listening position 24. Other examples of the prior art include U.S. Pat. Nos. 9,524,098 and 10,681,481.

There is a need, therefore, for an easy to use, accurate and effective system and method for more intelligently controlling phase and amplitude of the subwoofer(s) so that the subwoofer section(s) (e.g., (e.g., 22, 58 or 130) may be easily adjusted by a user in their room (e.g., 12) using a method which reduces the likelihood of wrong user inputs.

SUMMARY OF THE INVENTION

Accordingly, the present invention seeks to mitigate at least some of the above mentioned difficulties by providing an effective and accurate system and method for integrating a subwoofer's reproduced sound with the sound generated by other speakers in a home theater or stereo system by controlling a subwoofer's phase angle and providing a user adjustable phase alignment control input and method.

According to one aspect of the invention there is provided a phase alignment control system for a subwoofer that is configured for use in a multi-speaker home theater system. The phase alignment control system includes a first-order all-pass filter having a selectable tuning frequency and a polarity selection stage. The system allows one of at least four distinct user-selectable phase correction settings to be selected at a time. The phase alignment control system is configured to generate an output signal by applying a phase change to an input signal in dependence on which one of the distinct user-selectable phase correction settings has been selected by the user. The phase alignment control system is configured to apply the phase change to the input signal by a combination of (a) the first-order all-pass filter causing a phase change as a result of a selected all-pass filter tuning frequency $f_0$ and (b) the polarity selection stage selectively applying, or not applying, a polarity inversion. It may be that the phase alignment control system is configured to apply the phase change to the input signal by a combination only of (a) the first-order all-pass filter causing a phase change and (b) the polarity selection stage selectively applying, or not applying, a polarity inversion. For example, it may be that there need be no other filter stages provided for the purposes of phase correction, or for correcting for signal changes caused by filter implemented the purposes of phase correction. For example, it may be that the phase alignment control system comprises only one first-order all-pass filter—i.e. a single first-order all-pass filter.

It may be that the phase alignment control system is configured such that in response to a first user-selectable phase correction setting corresponding to a first desired change in phase angle, namely $X_1$ degrees, the first desired change in phase angle is achieved by (a) the first-order all-pass filter causing a phase change of Y degrees, and (b) the polarity selection stage applying a polarity inversion thus adding a 180 degree phase change, wherein the magnitude of the difference between $X_1$ and Y is 180 degrees. It may be that the phase alignment control system is additionally, or alternatively, configured such that in response to a second user-selectable phase correction setting corresponding to a second desired change in phase angle, namely $X_2$ degrees, the second desired change in phase angle is achieved by (a) the first-order all-pass filter causing a phase change of $X_2$ degrees, and (b) the polarity selection stage not applying a polarity inversion. It may be that the phase alignment control system is additionally, or alternatively, configured such that in response to a third user-selectable phase correction setting corresponding to a third desired change in phase angle, namely 180 degrees, the third desired change in phase angle is achieved by (a) the first-order all-pass filter not causing a phase change, and (b) the polarity selection stage applying a polarity inversion. It may be that the phase alignment control system is additionally, or alternatively, configured such that in response to a fourth user-selectable phase correction setting corresponding to a fourth desired change in phase angle, namely 0 degrees, the fourth desired change in phase angle is achieved by (a) the first-order all-pass filter not causing a phase change, and (b) the polarity selection stage not applying a polarity inversion. It may be that the phase alignment control system is configured as set out above in relation to the first to fourth user-selectable phase correction settings and is additionally configured such that in response to a fifth user-selectable phase correction setting corresponding to a fifth desired change in phase angle, namely $X_5$ degrees, the fifth desired change in phase angle is achieved by (a) the first-order all-pass filter causing a phase change of Y degrees, and (b) the polarity selection stage applying a polarity inversion thus adding a 180 degree phase change. It may be that none of 0°, 180°, $X_1$°, $X_2$°, and $X_5$° are equal.

At least one, and preferably at least two (and possibly only two), user-selectable phase correction settings may be in the range of −10 to +100 degrees. At least one, and preferably at least two (and possibly only two), user-selectable phase correction settings may be in the range of +80 to +190 degrees. At least one and preferably at least two (and possibly only two), user-selectable phase correction settings may be in the range of +10 to −100 degrees. At least one, and preferably at least two (and possibly only two), user-selectable phase correction settings may be in the range of −80 to −190 degrees. There may be eight or more user-selectable phase correction settings. There may be 24 or fewer user-selectable phase correction settings. The user-selectable phase correction setting are preferably at evenly spaced phase increments.

In embodiments further described and illustrated below, the phase alignment control system is configured such that the selected tuning frequency of the first-order all-pass filter is selected at least partly in response to a subwoofer cross-over frequency. There may be embodiments of the invention providing benefit in a case where the subwoofer cross-over frequency is a value which is pre-selected, for example pre-set in a manner not able to be varied by the user. It may be that the subwoofer cross-over frequency may be a value which can be user selected. It may be that the phase alignment control system is also configured such that the selected tuning frequency of the first-order all-pass filter is selected in response to a subwoofer cross-over frequency and to which of the distinct user-selectable phase correction settings is selected. It may be that for a first sub-set of distinct user-selectable phase correction settings, the tuning frequency selected is less than the subwoofer cross-over frequency and for a second sub-set of distinct user-selectable phase correction settings the tuning frequency selected is more than the subwoofer cross-over frequency. In certain cases (for example if the user-selectable phase correction setting is either −90 or +90 degrees), the selected tuning frequency is selected to be equal to the subwoofer cross-over frequency. It will be appreciated that, in embodiments, the selection of the tuning frequency of the first-order all-pass filter is selected automatically, for example by means of a digital signal processor, executable software, computer, control circuit or other electronic means. The phase alignment control system may for example include such electronic means. The phase alignment control system may include a polarity inverter. The phase alignment control system may include an adjustable amplifier gain stage. For example, the polarity selection stage (e.g. polarity inverter) may optionally include an adjustable amplifier gain stage.

The phase alignment control system may be wholly integrated in or on a subwoofer. The phase alignment control system may be partially integrated in or on a subwoofer. The phase alignment control system may be partially integrated in or on a device, for example an AVR, which outputs an audio signal to be received by a subwoofer. The phase alignment control system may be wholly integrated in or on such a device.

There may additionally be provided a user display device for use with the phase alignment control system. The user display device may for example be configured to display which of the distinct user-selectable phase correction settings is selected. The user display device may be configured to allow the user to select a desired user-selectable phase correction setting. The user display device may form part of a subwoofer. The user display device may form part of a subwoofer. The user display device may form part of a device, for example an AVR, which outputs an audio signal to be received by a subwoofer. The user display device may be a remote device (e.g. a remote control unit, preferably a wireless remote control unit).

According to another aspect of the invention, there is provided a subwoofer including an integrated phase alignment control system according to any aspect of the invention as claimed or described herein.

According to a yet further aspect of the invention, there is provided a multi-speaker home theater system. The multi-speaker home theater system may include a subwoofer and a phase alignment control system according to any aspect of the invention as claimed or described herein, the subwoofer being driven in dependence on the output signal from the phase alignment control system.

The multi-speaker home theater system may include at least one subwoofer loudspeaker driver having a low-frequency range of operation and multiple other loudspeaker drivers each having a higher frequency range of operation, the loudspeaker drivers being arranged to provide a surround sound system. The multi-speaker home theater system may include an audio signal source, for example an AVR. The system is preferably configured such that a user of the system is able to select a cut-off frequency that determines how an audio signal is distributed between the subwoofer loudspeaker driver and one or more of the other loudspeaker drivers, optionally from one of a set of discrete values. The system is additionally, or alternatively, configured such that a subwoofer phase correction value can be used by the system to perform a subwoofer phase correction. Preferably, the subwoofer phase correction value is able to be selected by a user of the system, optionally from one of a set of discrete values. The multi-speaker home theater system has phase-changing digital signal processor (preferably in the form of a first-order all-pass filter) and a polarity inverter. The digital signal processor and the polarity inverter are together configured to modify the phase of an audio signal from (including being derived from) the audio signal source before such signal is passed to the subwoofer loudspeaker driver. In use, the phase of the signal is modified (e.g. by a first-order all-pass filter operating at a tuning frequency that is automatically selected in dependence on the subwoofer phase correction value selected and the cut-off frequency selected), for example enabling the user to reduce (e.g. correct) for subwoofer signal phase errors that might otherwise be present. The phase of the signal is selectively modified by the polarity inverter causing a 0 or 180 degree phase change in dependence on the subwoofer phase correction value selected.

There is provided, according to a yet further aspect of the invention, a method of operating a subwoofer, for example being a phase alignment control method for a subwoofer, by modifying the phase of the input signal with a first-order all-pass filter ("APF") and changing, or not changing, the polarity of the signal. The method may include one or more, preferably all of, the following steps. There may be a step of (a) receiving an audio signal input (e.g., from an AVR or the like) via a low pass filter which is configured to operate in dependence on a selected low pass filter control frequency. There may be a step of (b) sensing or determining the low pass filter control frequency and a desired phase control setting selected by a user from a plurality of distinct user selectable phase correction settings. There may be a step of (c) computing or selecting a desired tuning frequency and a desired polarity (e.g. inverting "−" or not "+") in response to the low pass filter control frequency and the desired phase control setting so sensed or determined. There may be a step of (d) modifying the phase of the input signal with a first-order all-pass filter ("APF") set to the desired tuning frequency so computed or selected and there may be a step of changing, or not changing, the polarity in response to the desired polarity so computed or selected. There may be a step of (e) driving the subwoofer with a signal resulting from the audio signal input so modified, the signal being optionally amplified (or further amplified) before being supplied to the subwoofer driver. There are preferably no other digital signal processing stages, or filtering stages, after the APF modifies the phase and the polarity is changed (or not) before the signal is passed to the subwoofer driver.

It is preferred for the signal processing steps to be performed by digital signal processing, but it will be appreciated that some or all aspect of the embodiments described herein could be performed in part by analogue circuit counterparts or other electronic means.

Thus embodiments of the method of the invention enable the modifying of the phase of the input signal to provide, or most nearly provide, the desired phase corrected signal output for the driver of the subwoofer. Certain embodiments may therefore be in the form of a phase alignment control method.

The step of computing or selecting the desired tuning frequency (and, optionally, the step of computing or selecting the desired polarity) may comprise interrogating a look-up table stored in a memory device. Such a look-up table may provide the desired tuning frequency values for different combinations of values low pass filter control frequencies and desired phase control settings. Such a look-up table may provide the desired tuning frequency values for each possible combination of a plurality of values (for example, at least ten) of low pass filter control frequencies and of a plurality (for example, between 4 and 24, inclusive) of desired phase control settings. The phase control settings may be at evenly spaced phase increments. The step of computing or selecting the desired tuning frequency (and, optionally, the step of computing or selecting the desired polarity) may, additionally or alternatively, comprise calculations or decisions that do not require a look-up table.

It will of course be appreciated that features described in relation to one aspect of the present invention may be incorporated into other aspects of the present invention. For example, the method of the invention may incorporate any of the features described with reference to the apparatus of the invention and vice versa.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE FIGURES

Exemplary illustrations of the prior art and embodiments of the present invention will now be described by way of example only with reference to the accompanying schematic drawings.

FIGS. 2A-5 illustrate an improved multi-speaker home theater system including an Improved Subwoofer System and a Phase Alignment Control system and method for Subwoofers, in accordance with embodiments of the present invention.

FIG. 4 is a signal flow diagram illustrating elements of an improved multi-speaker home theater system including an Improved Subwoofer System and a Phase Alignment Control system and method for Subwoofers, in accordance with embodiments of the present invention.

FIG. 5 illustrates contents of a look-up table or matrix which is incorporated into digital signal processing as programming or stored in memory as a matrix to generate an improved phase aligned subwoofer drive signal for use in the Improved Subwoofer System and a Phase Alignment Control method of FIGS. 2A-4, in accordance with embodiments of the present invention.

DETAILED DESCRIPTION

Figure 1A:
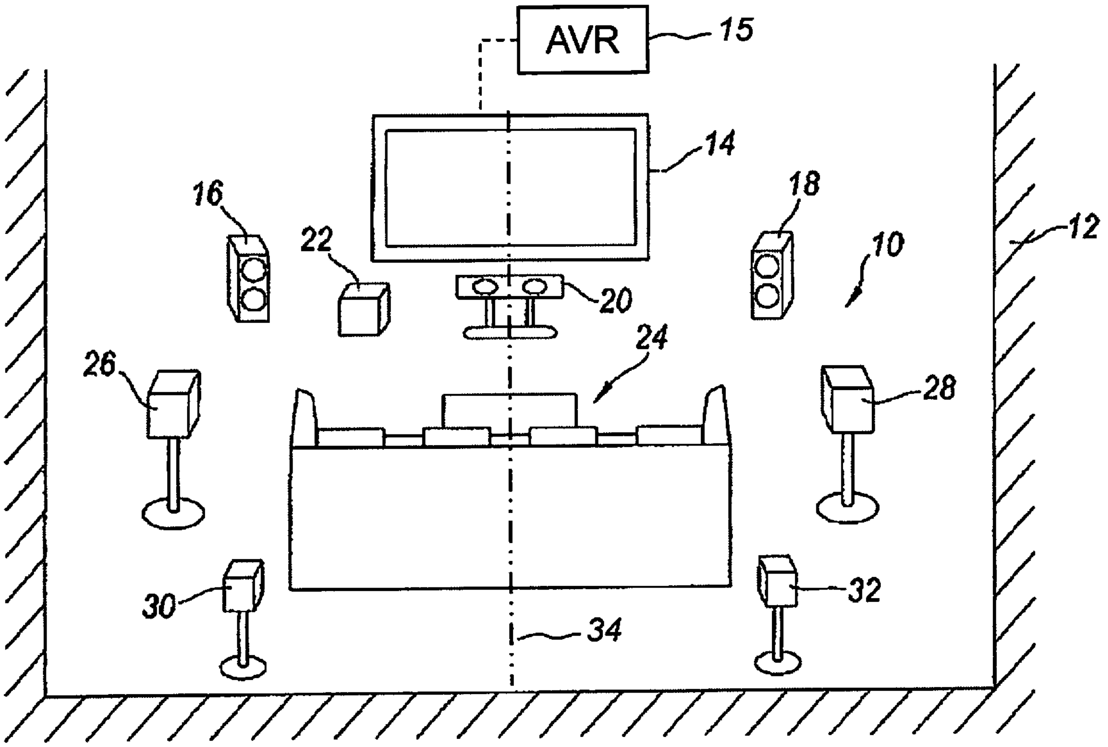
Fig. 1A (PRIOR ART)
FIGS. 1A and 1B are diagrams illustrating the elements of a typical home theater system in a listener's room, in accordance with the prior art.

There now follows a general description of embodiments of the invention including some variations not specifically illustrated. As is described in further detail below, the subwoofer phase alignment control system and method of embodiments of the present invention provide an easy and intuitive way for the installer, user or listener to control the phase angle of the signal presented to one or more low frequency loudspeaker(s) (e.g., an improved standalone subwoofer). The signal processing apparatus or circuitry used to achieve this includes an all-pass filter which feeds a stage that applies or omits a polarity inversion. The frequency tuning (i.e., the filter stage's "$f_0$") of the all pass filter and the condition (on/off) of the polarity inversion is directly related to the desired high frequency cutoff frequency, sometimes called the crossover frequency, and the desired amount of phase shift at that frequency.

Embodiments of the invention provide a selected amount of desired phase shift with the smallest (and least deleterious) amount of filtering. Phase shift is often required in a system consisting of a subwoofer or subwoofers and additional higher frequency loudspeakers (e.g. as in consumer home theater systems). The phase shift between the high and low frequency systems at the crossover frequency is rarely aligned properly for an even summed frequency response. By shifting the phase of the subwoofer, the response can be made flatter leading to a more natural sound. By doing so with the minimum amount of filtering ensures less group delay which also leads to a more natural sound.

This control can be implemented in Digital Signal Processing ("DSP") most readily and is the preferred embodiment. The necessary inputs from the user are the crossover frequency and the amount of desired phase shift. The parameters for the all-pass filter and the polarity inversion can be calculated or read for a simple table.

In embodiments, a standalone subwoofer (e.g., similar to 22 or 130) is configured with new control inputs and circuits including a phase control adjustment knob or slider having a plurality of (e.g., 4-24) distinct phase adjustment steps. For example, an eight step adjustment input includes 45 degree phase adjustment steps, each providing a discrete phase adjustment. Preferably the phase control setting has the discrete steps identified with user-readable indicia and an illuminating (e.g., LED) indicator by each phase adjustment setting position provides the user with additional visible confirmation of the operation of the intelligent phase control settings. In embodiments, the subwoofer system(s) (e.g., similar to 22, 58 or 130) are configured to communicate with and respond to a handheld remote controller which the user can use when in listening position 24. In the method of the present invention, the user can play selected program material through their sound system (e.g., like 10) but with the improved subwoofer(s) of the present invention and listen to the sound, changing between the plurality of (e.g., eight) phase control settings and switching back and forth between the settings, decide at each transition whether the system's sound is "better or worse" than the prior adjustment setting.

The improved subwoofer of the presently described embodiment of the invention has controls selected from the following options: Subwoofer volume, Subwoofer low pass frequency, Subwoofer low pass slope (filter order), other Subwoofer EQ settings, Subwoofer "Phase" adjustment, and Subwoofer polarity (absolute or inverted). In an embodiment, the Phase adjustment is in either 0 degrees to −135 degrees (in eight 45 degree increments) or 0 degrees to −165 degrees (in twenty four 15 degree increments); implemented by a sliding all-pass filter which can track the low pass filter control (referred to as "intelligent phase control").

Applicant's investigations and development studies on whether to use a delay vs using an all-pass filter to accomplish intelligent phase control have indicated that an all-pass filter implementation incorporated in each standalone subwoofer is more likely to achieve a good result when used to compensate for differences in low frequency systems (i.e. the natural roll-off of the loudspeakers (e.g., 22, 130). This type of difference is present in all systems. Delay is only effective if used to compensate for delay error. It is now preferred to address delay issues in the receiver (e.g., 15).

Turning now to FIGS. 2A to 5, an improved multi-speaker home theater system (e.g., 200) is shown which includes one or more Improved Subwoofer Systems 222 incorporating the Phase Alignment Control system and method of a specific embodiment, which will now be described in greater detail below.

Figure 1B:
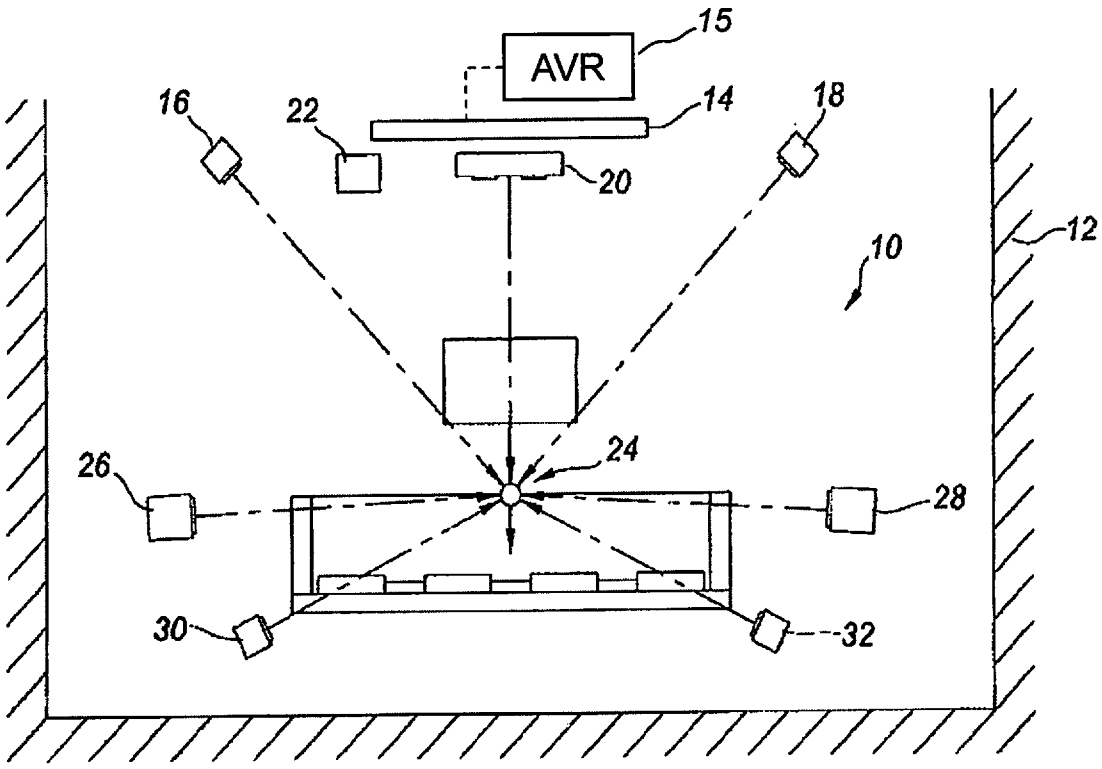
Fig. 1B (PRIOR ART)
Figure 2A:
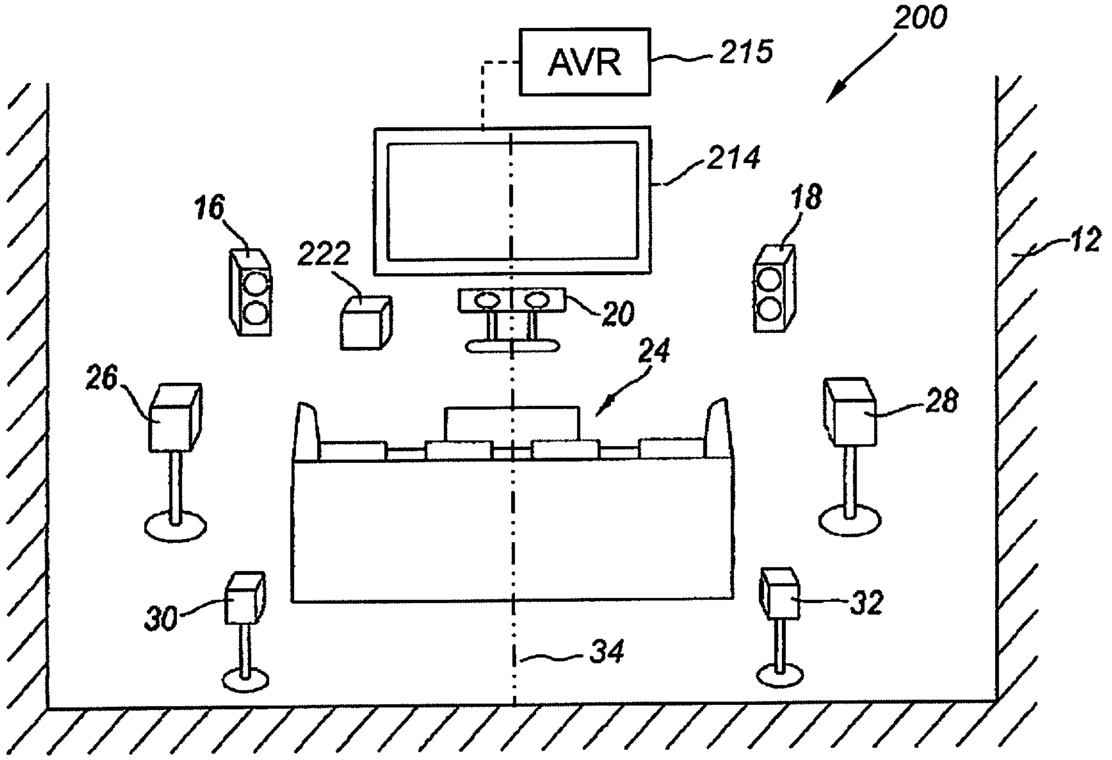
FIGS. 2A and 2B illustrate an improved multi-speaker home theater system including an Improved Subwoofer System and a Phase Alignment Control system and method for Subwoofers, placed in a listener's room, in accordance with embodiments of the present invention.
Figure 2B:
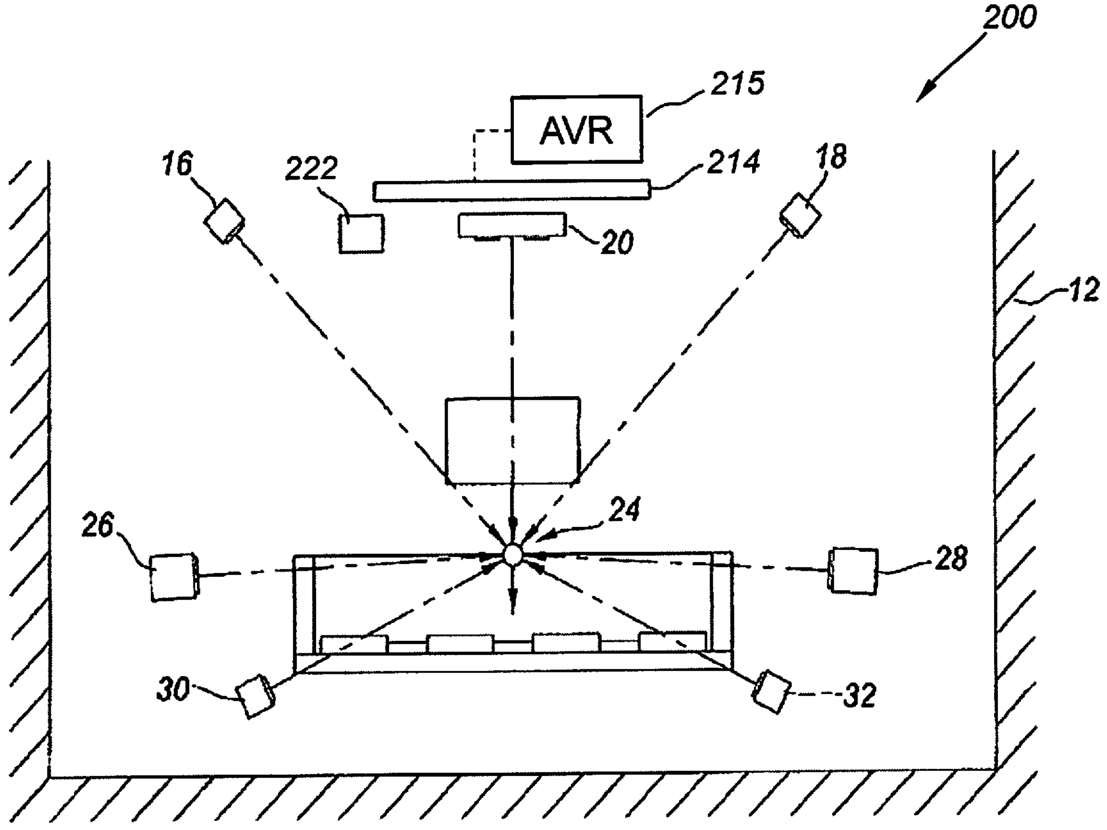

FIGS. 2A and 2B provide example perspective and top plan views of improved surround sound system 200 located in a typical media space, or room 12. The illustrated system may be a conventional Dolby® digital set-up having a home theater or other audio/video (AV) source 214, in embodiments including either, a typical AVR 15 (as shown in FIGS. 1A and 1B) or an improved AVR 215 (as shown in FIGS. 2A and 2B). System 200 may also include a traditional left channel speaker 16, a right channel speaker 18, and center channel speaker 20, used with an improved subwoofer 222, all located in front of a primary seating area for listeners at a listening station 24 such as a sofa or chair. In embodiments, the system includes left and right surround speakers 26 and 28 spaced from the sides of the listening station to provide a sense of spaciousness to sound radiated by the speakers, and providing ambient sounds for AV programs such as movies and concerts. In embodiments, home theater system 200 includes left and right back speakers 30 and 32 located generally behind and to the sides of the listening station and the speakers preferably are arranged around a center line 34 passing through the AV unit 214 and the listening station or listening position 24.

The illustrated system 200 and method of the presently described embodiment effectively and accurately integrate the sound from improved subwoofer 222 reproduced sound with the sound generated by other speakers in a home theater or stereo system by controlling a subwoofer's phase angle and providing a user adjustable phase alignment control input and method. The subwoofer phase alignment control system and method of the presently described embodiment provide an easy and intuitive way for the installer, user or listener to control or correct the phase angle of the signal presented to a low frequency loudspeaker (e.g., Driver D1 in subwoofer 222). The signal processing apparatus or circuitry used to achieve this includes a single all-pass filter 260 which feeds a stage that applies or omits a polarity inversion, depending on the preprogrammed parameters in a matrix 250 (e.g., as seen in FIG. 5). The frequency tuning (i.e., the filter stage's "$f_0$") of the all pass filter and the condition (on/off) of the polarity inversion is directly related to the desired high frequency cutoff frequency, sometimes called the crossover frequency, and the desired amount of phase shift at that frequency.

Figure 3A:
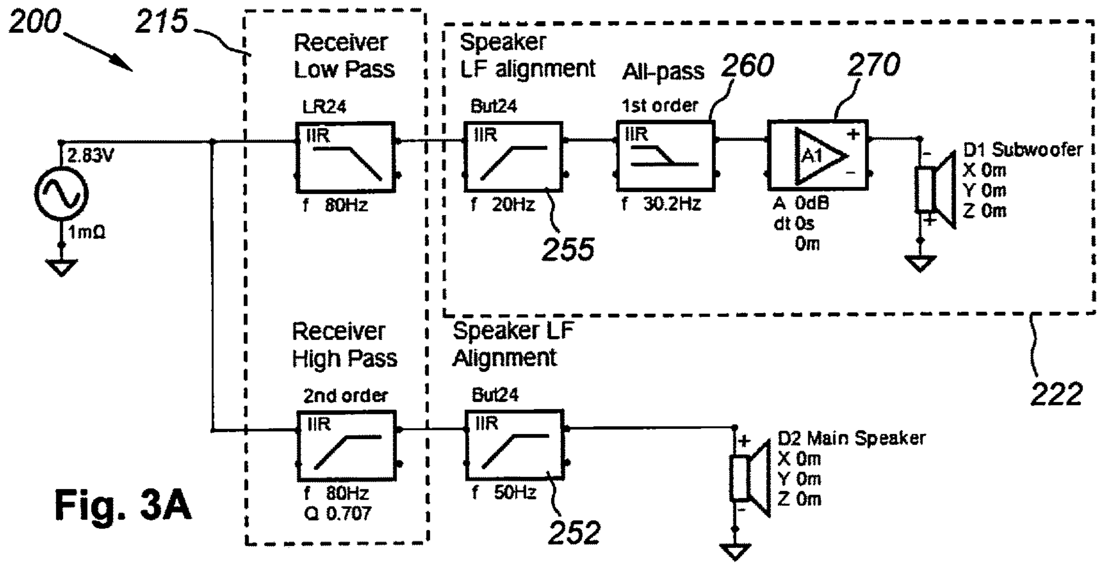
FIGS. 3A and 3B illustrate applicant's modelling and analytical work used to develop an improved multi-speaker home theater system including an Improved Subwoofer System and a Phase Alignment Control system and method for Subwoofers, in accordance with embodiments of the present invention.
Figure 3B:
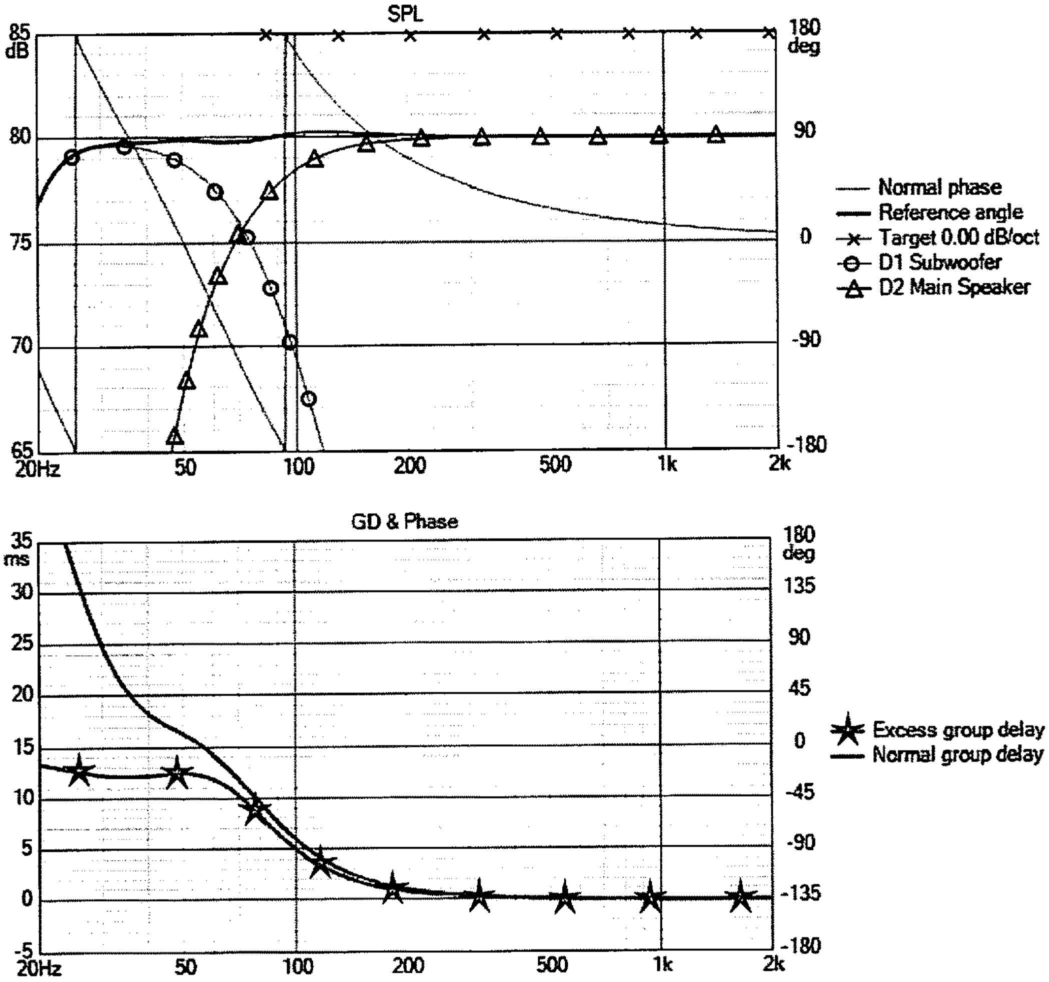
Figure 4:
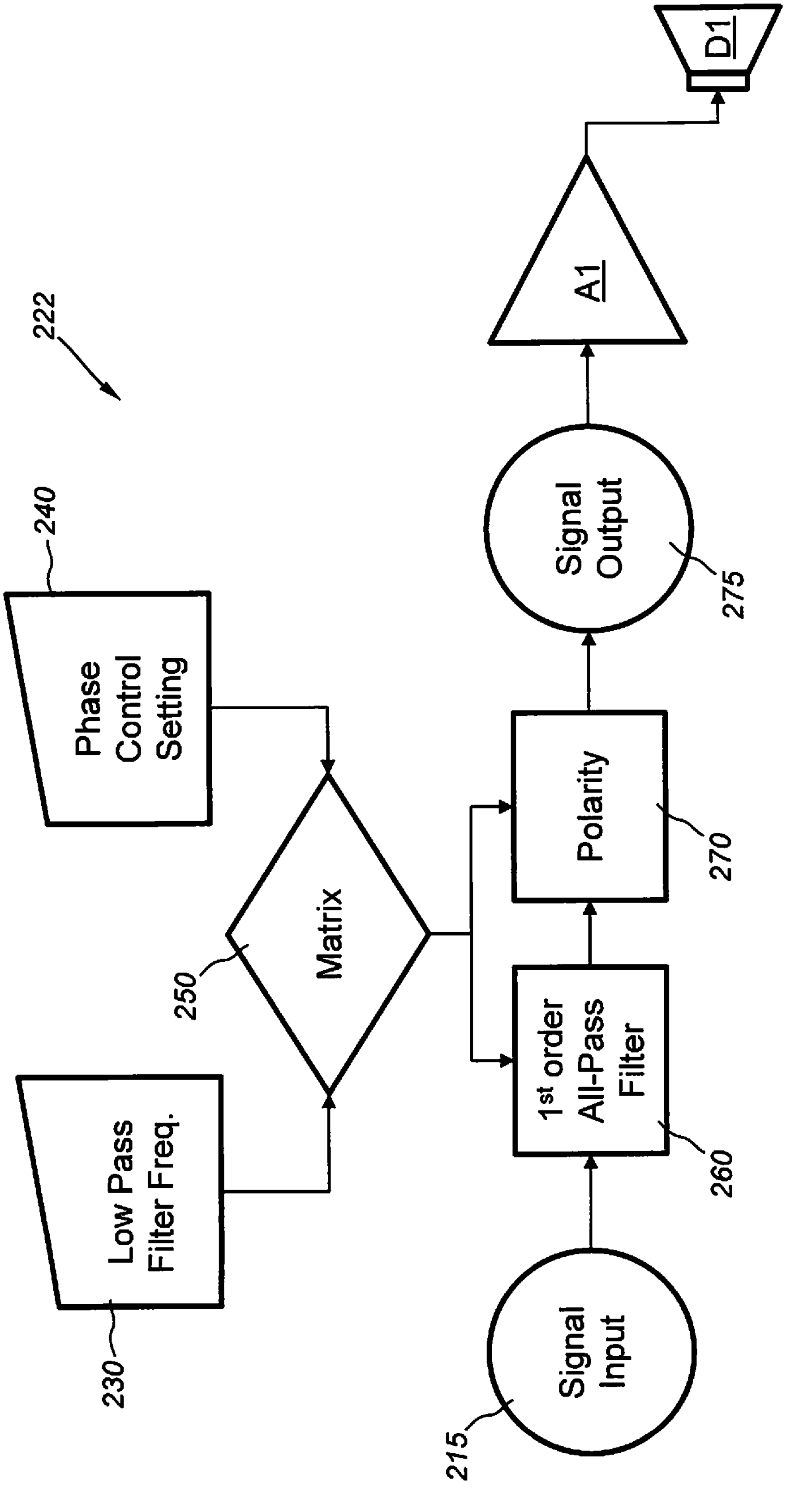

One embodiment of system 200 and the signal processing method of the present invention is illustrated in the Diagrams of FIGS. 3A, 3B, and 4 and the table or matrix of FIG. 5. FIGS. 3A and 3B illustrate and describe an exemplary prototype embodiment of the system and method of the present invention with phase shift and polarity settings that were developed to correct an exemplary phase error. FIG. 3A models the supply of an audio signal from a source to a subwoofer D1 and a main speaker D2 via various digital signal processing stages. In the illustrated example, a user has selected a crossover frequency of 80 Hz which is applied by the AVR 215, by means of a $4^{th}$ order L-R (Linkwitz-Riley) low-pass IIR ("infinite impulse response") filter for the signal received at the subwoofer driver D1 and a $2^{nd}$ order high-pass IIR filter for the signal received at the main speaker driver D2. FIG. 3A models the natural high pass characteristics of the main speaker by means of a 4th order Butterworth filter 252 (fc=50 Hz)—"Speaker LF Alignment". Similarly, the natural high pass characteristics of the subwoofer 222 are modelled by a 4th order Butterworth filter 255 (fc=20 Hz). It will be appreciated that model filter blocks 252, 255 as shown in FIG. 3A are circuit diagram elements modelling the behavior of the system—so modelled filters 252, 255 are not elements in the physical embodiment of the system of the present invention (an example of which is illustrated in FIG. 4).

When improved system 200 is in use, the listener or user (e.g., when in position 24) adjusts for phase correction by ear, and chooses, from a finite choice of discrete phase correction values, a selected phase correction (e.g., of +40 degrees). As a result (of the user's choices of a crossover at 80 Hz and a phase correction of +40 degrees) the audio signal passes a first-order all-pass filter that has been tuned to ~30 Hz (this provides a phase shift of about −140° at the cut-off frequency of 80 Hz and a polarity inverter 270 (which effectively introduces a 180° phase shift), yielding the desired phase correction of 40 degrees at the cut-off frequency of 80 Hz. There is +0.6 dB of gain to subwoofer. In the circuit diagram model shown in FIG. 3A this combines a phase shift (of minus 140 degrees) a polarity inversion (effectively a phase shift of plus 180 degrees) to correct for a phase error or minus 40 degrees (i.e. the correction being plus 40 degrees).

FIG. 3B shows the (simulated) sound pressure level ("SPL") graph (upper graph) and the group delay/phase graph (lower graph) corresponding the set-up illustrated in FIG. 3A. It will be seen from the SPL curves that the frequency response is very flat (close to ideal) in the cross-over region with an error (difference between performance and ideal characteristics) of about +/−0.2 dB. The excess group delay is about 5 ms, and acceptable. The combination of polarity inversion and all-pass filter thus provides an accurate magnitude response at the cost of some additional, but acceptable, group delay.

The example circuit shown in FIG. 3A illustrates the kind of experimental work which was employed to develop the DSP configuration of a working embodiment capable of providing phase corrections given many different combinations of input parameters, as illustrated in the matrix settings in the embodiment illustrated by FIG. 5.

The purpose of this presently described embodiment is to provide a selected amount of desired phase shift (or phase error correction) with the smallest (and least deleterious) amount of filtering. Phase shift is often required in a system consisting of a subwoofer or subwoofers (e.g., 222, with Subwoofer Driver D1) and the other loudspeakers (e.g. 16, 18, 20, with main speaker drivers D2) as found in consumer home theater systems. The phase shift between the high and low frequency systems at the crossover frequency is rarely aligned properly for an even summed frequency response. By shifting and correcting the phase of the signal input to the subwoofer driver D1, the combined system's response can be made flatter, leading to a more natural sound. Without adequate treatment of the sub-woofer's phase alignment at the cross-over frequency (i.e. with the use of the presently described embodiment) so that it aligns with the rest of the speakers of the sound system, the bass sounds can be caused to smear at or near the cross-over or cutoff frequency and to sound muddy. Furthermore, accomplishing the corrective phase shift with a minimum amount of filtering ensures less group delay which also leads to a more natural sound.

This control system and method is preferably implemented in Digital Signal Processing ("DSP"). The necessary inputs from the user are the low pass filter crossover frequency 230 and the amount of desired phase shift or phase control setting 240 (see, e.g., FIG. 4). The parameters for the all-pass filter and the polarity inversion can be calculated or read from a simple Look-Up-Table ("LUT") or matrix 250 (see, e.g., FIG. 5). In the example embodiments of FIGS. 2A-5, a standalone subwoofer (e.g., 222) is configured with new control inputs and circuits including a phase control adjustment knob or slider (providing an input signal to phase control setting input 240) having a plurality of (e.g., 4-24, but in the illustrative example of FIG. 5, eight) distinct phase control adjustment steps. For example, matrix 250 provides an eight step adjustment input comprising eight 45 degree phase adjustment steps, each providing a discrete user-selectable phase adjustment. In embodiments, the phase control setting has the discrete steps identified with user-readable indicia and an illuminating (e.g., LED) indicator by each phase adjustment setting position provides the user with additional visible confirmation of the operation of the intelligent phase control settings. In embodiments, the subwoofer system(s) (e.g., 222) communicate with and respond to a handheld remote controller (not shown) which the user can use when in listening position 24. In the method of the present invention, the user can play selected program material through their sound system (200) but with the improved subwoofer(s) 222 of the presently described embodiment and listen to the sound, changing between the plurality of (e.g., eight) phase control settings and switching back and forth between the settings, decide at each transition whether the system's sound is "better or worse" than the prior adjustment setting.

The improved subwoofer 222 of the presently described embodiment is an Active subwoofer system with a dedicated amplifier system A1 and signal processing circuitry with user-adjustable controls selected from the following options: Subwoofer volume, Subwoofer low pass frequency (e.g., 230), Subwoofer low pass slope (filter order), other Subwoofer EQ settings, Subwoofer "Phase" adjustment (e.g., 240), and Subwoofer polarity (absolute or inverted). The illustrated phase adjustment setting 240 may be chosen by the user to be any value from the group consisting of 0 degrees to +/−135 degrees (in 45 degree increments) and 180 degrees (i.e. 8 different settings). An embodiment not illustrated allows the user to choose from any of twenty four phase correction settings chosen from the group consisting of 0 degrees to +/−165 degrees in 15 degree increments and 180 degrees. A further embodiment not illustrated allows the user to choose from any of four discrete phase correction settings chosen from 0, +90, −90, and +180 degrees. The phase correction is implemented by a sliding all-pass filter which can track the low pass filter control (which is referred to herein as "intelligent phase control").

Applicant's investigations and development studies on whether to use a delay versus using an all-pass filter to accomplish intelligent phase control have indicated that an all-pass filter implementation incorporated in each standalone subwoofer is more likely to achieve a good result when used to compensate for differences in low frequency systems—i.e. the natural roll-off of the loudspeakers (e.g., 22, 130). This type of difference is present in all systems. In system 200, delay is only used to compensate for delay error, and delay issues are optionally addressed in the improved AVR (e.g., 215).

Returning to FIGS. 2A-5, and FIG. 4 in particular, in system 200 and improved subwoofer 222, the intelligent phase control system and method (e.g., DSP) uses polarity adjustments (i.e. inversion or no inversion) and all pass filter signal processing in a manner which responds to inputs including low pass filter frequency (e.g. a user-selected crossover frequency) and the user-selected phase control setting (e.g., as illustrated in FIGS. 4 and 5). An audio input signal 215 is processed by the single first order all-pass filter 260 and inverted, or not, by the polarity inverter 270 stage, to produce the output signal 275 which is then amplified by gain stage A1 before being passed to the subwoofer driver D1. The modification by the all-pass filter 260 and the polarity being adjusted (or not adjusted) together produce the desired phase shift at the crossover frequency of the low pass filter 230. The tuning frequency $f_0$ of the all-pass filter 260 is determined, with the use of the matrix 250, in dependence on both the desired phase shift (selected by the user with the phase control setting 240) and the crossover frequency of the low pass filter 230 (also selected by the user). Polarity is used to augment the all-pass phase shift (by selectively adding an effective phase change of 0 degrees or 180 degrees) without adding the extra group delay that would otherwise result from the cascaded all-pass filters that would be necessary to cover the range of phase 0-345°. The inversion or non-inversion of polarity is also selected with the use of the matrix 250.

The matrix of the exemplary embodiment shown in FIG. 5 can be understood as follows. There are 8 different phase correction settings available to the user, namely (i) −135°, (ii) −90°, (iii) −45°, (iv) 0°, (v) +45°, (vi) +90°, (vii) +135° and (viii) +180°. There are also eighteen different settings for the crossover frequency, namely (i) 40 Hz, (ii) 45 Hz, (iii) 50 Hz, (iv) 55 Hz, (v) 60 Hz, (vi) 65 Hz, (vii) 70 Hz, (viii) 75 Hz, (ix) 80 Hz, (x) 85 Hz, (xi) 90 Hz, (xii) 95 Hz, (xiii) 100 Hz, (xiv) 110 Hz, (xv) 120 Hz, (xvi) 130 Hz, (xvii) 140 Hz, and (xviii) 150 Hz. The matrix 250 provides, by means of a look-up table stored in digital memory, a way of determining the value for the tuning frequency $f_0$ of the all-pass filter 260 and whether or not to apply inversion by the polarity inverter 270 that together provide the desired phase correction at the selected cut-off frequency of the crossover. For example, the user-selectable phase correction setting may be a change of +45° and the cut-off frequency may be selected by the user as 70 Hz. The matrix 250, when interrogated with such values (+45° and 70 Hz) yields a tuning frequency $f_0$ for the all-pass filter 260 of 28.994 Hz (which causes a phase change of −135° at 70 Hz) and a polarity inversion (which causes a +180° phase change), thus achieving the desired correction in phase angle of +45° with minimum group delay in the audio signal path. As another example, the user-selectable phase correction setting may be a change of −135° and the cut-off frequency may be selected as 70 Hz. The matrix 250, when interrogated with such values (−135° and 70 Hz) yields a tuning frequency $f_0$ for the all-pass filter 260 of 28.994 Hz (which causes a phase change of −135° at 70 Hz) but no polarity inversion, thus achieving the desired correction in phase angle. As yet another example, the user-selectable phase correction setting may be a change of +180° and the cut-off frequency may be selected as 90 Hz. The matrix 250, when interrogated with such values (+180° and 90 Hz, or indeed any cut-off frequency) yields a polarity inversion (which causes a +180° phase change) and the bypassing of the all-pass filter 260 (i.e. the all-pass filter not causing any additional phase change), thus achieving the desired correction in phase angle of +180°.

As yet another example, if the user-selectable phase correction setting corresponds to no change in phase angle, i.e. 0 degrees, then the matrix 250, when interrogated causes there to be no polarity inversion (i.e. no phase change) and the bypassing of the all-pass filter 260, thus achieving the desired result, namely no correction in phase angle. It will also be seen from FIG. 5 that, if the user-selectable phase correction is set to be either +90° or −90°, then the required tuning frequency for the all-pass filter will simply be the same as the selected cut-off frequency value.

The signal processing method and system 222 of the presently described embodiment are surprisingly effective in part because of the unique combination of adjusting the polarity and phase controls concurrently to arrive at the desired phase shift (see, e.g., FIG. 5). Changing the all-pass frequency tuning frequency $f_0$ based on the low pass filter frequency and desired phase shift allows the system to provide a more natural and less deleteriously affected output signal for subwoofer driver D1 which integrates more naturally with the sound from the other speakers in system 200. Other benefits arising from use of system 200 are:

(a) a more precise and intuitive tuning of the phase control to correct subwoofer signal phase errors (because typical prior art phase controls are only accurate at one frequency since they do not change with the low pass filter setting 230 and since the phase control setting results in the phase shift indicated, it is easier for the user to control (e.g., with a remote control, from user listening position 24, while music or test tones are playing); and (b) less group delay; by using fewer filter stages to arrive at the necessary phase shift, the group delay is less. Less group delay leads to more accurate, better sounding bass. The result is that the user should be able to better tune his subwoofer to blend with the rest of their audio system.

The following clauses form part of the present disclosure:

(Clause 1) FIGS. 2A-5 illustrate features of an improved multi-speaker home theater system including an Improved Subwoofer System and a Phase Alignment Control system for Subwoofers, including: a subwoofer system having an audio signal input (e.g., from AVR 15 or 215) and control inputs for Low Pass filter frequency 230 and desired phase control setting 240 (e.g., with a hand-held remote controller (not shown)); wherein said control input for desired phase control setting 240 includes a plurality of (e.g., 4-24) distinct user selectable phase correction settings at evenly spaced phase increments; and wherein the Phase Alignment Control system comprises a single first order all-pass filter 260 having a selectable $f_0$ tuning frequency and a polarity selection stage optionally including an adjustable amplifier gain stage A1.

(Clause 2) FIGS. 2A-5 also illustrate that the Phase Alignment Control system provides (a) a more precise and intuitive tuning of the phase control to correct subwoofer signal phase errors (because typical prior art phase controls are only accurate at one frequency since they do not change with the low pass filter setting 230 and since the phase control setting results in the phase shift indicated, it is easier for the user to control; and (b) less group delay; by using fewer filter stages to arrive at the necessary phase shift, the group delay is less. Less group delay leads to more accurate, better sounding bass. The result is that the user should be able to better tune his subwoofer to blend with the rest of their audio system.

(Clause 3) The Improved multi-speaker home theater system including an Improved Subwoofer System and Phase Alignment Control system for Subwoofers of Clause 1, wherein said control input for desired phase control setting 240 includes eight distinct user selectable phase correction settings at evenly spaced (45 degree) phase increments.

(Clause 4) The Improved multi-speaker home theater system including an Improved Subwoofer System and Phase Alignment Control system for Subwoofers of Clause 1, wherein said plurality of (e.g., eight) distinct user selectable phase correction settings at evenly spaced (e.g., 45 degree) phase increments (and display indicia showing which phase correction is selected) are provided on a user accessible surface of the improved subwoofer 222 or on a user's handheld remote.

(Clause 5) FIGS. 2A-5 and the accompanying description also show that the Phase Alignment Control method includes the user-selected Phase Correction setting method steps: (a) providing a subwoofer system having an audio signal input (e.g., from AVR 15 or 222) and control inputs for Low Pass filter frequency 230 and desired phase control setting 240; wherein said control input for desired phase control setting 240 includes a plurality of 4-24 distinct user selectable phase correction settings at evenly spaced phase increments; and wherein said Phase Alignment Control system comprises a single first order all-pass filter ("APF") having a selectable $f_0$ tuning frequency and a polarity selection stage optionally including an adjustable amplifier gain stage;

(b) sensing or determining the current control inputs for Low Pass filter frequency 230 and desired phase control setting 240; and (c) either computing or selecting a desired APF selectable $f_0$ tuning frequency and a polarity (+ or −) adjustment to most nearly provide the desired phase corrected signal output for the driver D1 of improved subwoofer 222.

(Clause 6) The Phase Alignment Control method for Subwoofers of Clause 5, wherein the step of selecting a desired APF selectable $f_0$ tuning frequency and a polarity (+ or −) adjustment to most nearly provide the desired phase corrected signal output for the driver D1 of improved subwoofer 222 comprises storing a look-up table or matrix 250 within or in a manner accessible by improved subwoofer 222 having said plurality of 4-24 distinct user selectable phase correction settings at evenly spaced phase increments.

Persons having skill in the art will appreciate that the present invention makes a number of improvements in active subwoofers available, in accordance with the present invention. The following clauses also form part of the disclosure:

(Clause 7) An active subwoofer for use in a multi-speaker home theater system (e.g., 200) including an Improved Phase Alignment Control system for Subwoofers, comprising:

(a) a subwoofer system (e.g., 222) having an enclosure supporting at least one amplifier stage A1 configured to drive at least one electrodynamic transducer D1 in response to an audio signal input 215 (e.g., from AVR 15 or 215), a first user adjustable control input 230 for Low Pass Filter Cutoff frequency and a second user adjustable control input 240 for desired Phase Control Setting;

(b) wherein said second control input 240 provides a user-selected Phase Correction setting (e.g., with a hand-held remote controller (not shown)) selected from a plurality of at least four distinct user selectable Phase Correction settings at evenly spaced phase increments to a Phase Alignment Control system 222; and wherein said first control input 230 provides a user selectable Low Pass filter Cutoff frequency signal to said Phase Alignment Control system 222;

(c) wherein said Phase Alignment Control system 222 comprises a single All-Pass filter 260 having an adjustable All Pass tuning frequency f0 which is adjustable and, in use, automatically set in response to said user selectable Low Pass filter Cutoff frequency and (ii) a polarity selection stage 270 optionally incorporated into said amplifier gain stage A1; and (d) wherein said Phase Alignment Control system 222 is responsive to both (i) said first control input 230 and said user selectable Low Pass filter Cutoff frequency signal and (ii) said second control input 240 and said user-selected Phase Correction setting and, in response thereto, generates a phase, polarity and amplitude adjusted audio signal for said subwoofer driver D1.

(Clause 8) The active subwoofer of clause 7, wherein said second control input 240 includes a plurality of eight distinct user selectable phase correction settings at evenly spaced phase increments to said Phase Alignment Control system 222; and wherein said first user adjustable control input 230 for Low Pass filter Cutoff frequency is configured to operate in a frequency range from 40 Hertz to 150 Hertz in a selected plurality of evenly spaced frequencies.

(Clause 9) The active subwoofer of clause 8, wherein said first control input 230 provides said user selectable Low Pass filter Cutoff frequency signal to said Phase Alignment Control system 222 as one user-selected cutoff frequency selected from the following evenly spaced frequencies: 40 Hz, 45 Hz, 50 Hz, 55 Hz, 60 Hz, 65 Hz, 70 Hz, 75 Hz, 80 Hz, 85 Hz, 90 Hz, 95 Hz, 100 Hz, 105 Hz, 110 Hz, 115 Hz, 120 Hz, 125 Hz, 130 Hz, 135 Hz, 140 Hz, 145 Hz and 150 Hz; and wherein said all pass filter's selectable tuning frequency $f_0$ is automatically adjusted in response to said user-selected cutoff frequency and said user-selected Phase Correction setting.

(Clause 10) The active subwoofer of clause 7, wherein said second control input 240 provides one user-selected phase correction settings to said Phase Alignment Control system 222 from the following evenly spaced phase correction settings: −135 degrees, −90 degrees, −45 degrees, zero degrees, +45 degrees, +90 degrees, +135 degrees and +180 degrees.

(Clause 11) The active subwoofer of clause 7, wherein said Phase Alignment Control system 222 is programmed to provide an adjustable All Pass tuning frequency f0 which is automatically set to be equal to said user selectable Low Pass filter Cutoff frequency when said user-selected Phase Correction setting is −90 degrees or +90 degrees.

(Clause 12) The active subwoofer of clause 7, wherein said Phase Alignment Control system 222 is programmed to automatically bypass said All Pass filter 260 when said user-selected Phase Correction setting is zero degrees or 180 degrees.

(Clause 13) The active subwoofer of clause 7, wherein said Phase Alignment Control system 222 is configured and programmed to respond to a user-selected Phase Correction setting and a user selectable Low Pass filter Cutoff frequency signal transmitted from a handheld remote control when held by a user at a listening position 24 in a room, while listening to a movie soundtrack, music or test tone audio signals.

Persons having skill in the art will appreciate that the present invention makes a number of improvements in methods for accurately selecting an optimum phase alignment in active subwoofers available, in accordance with the present invention. The following clauses also form part of the disclosure:

(Clause 14) A subwoofer phase control method allowing a listener or user to quickly and accurately select the most satisfying subwoofer phase adjustments or phase correction settings for blending the subwoofer's output with the remainder of a multi-speaker system's output in a room 12, comprising:

(14*a*) providing a subwoofer system (e.g., 222) configured to receive an audio signal input 215 (e.g., from AVR 15 or 215), and having a first user adjustable control input 230 for Low Pass Filter Cutoff frequency and a second user adjustable control input 240 for desired Phase Control Setting; wherein said second control input 240 provides a user-selected Phase Correction setting selected from a plurality of at least four distinct user selectable Phase Correction settings at evenly spaced phase increments to a Phase Alignment Control system 222; and wherein said first control input 230 provides a user selectable Low Pass filter Cutoff frequency signal to said Phase Alignment Control system 222; wherein said Phase Alignment Control system 222 comprises a single All-Pass filter 260 having an adjustable All Pass tuning frequency $f_0$ which is adjustable and, in use, automatically set in response to said user selectable Low Pass filter Cutoff frequency;

(14*b*) placing said subwoofer system 222 in a room 12 with a listening position 24 for the listener or user and (14c) playing music, a movie soundtrack, a test audio signal or other audio program material through all of the speakers in the stereo or home theater system so that the user or listener in position 24 can audibly evaluate the subwoofer's output when playing simultaneously with the remainder of the multi-speaker system's output, while (14d) detecting a user's first adjustment of said second control input 240 of said user-selected Phase Correction setting Phase Alignment Control system 222 (e.g., with a hand-held remote controller (not shown)), said user's first adjustment being a first selection from said at least four distinct user selectable Phase Correction settings, and, in response thereto, (14e) generating a first phase, polarity and amplitude adjusted audio signal 275 for said subwoofer, wherein said user at listening position 24 may evaluate a first blended subwoofer's output with the remainder of the system's speakers' output in the room;

(14f) detecting a user's second adjustment of said second control input 240 of said user-selected Phase Correction setting Phase Alignment Control system 222, said user's second adjustment being a second selection from said at least four distinct user selectable Phase Correction settings which differs from said user's first adjustment, and, in response thereto, (14g) generating a second phase, polarity and amplitude adjusted audio signal 275 for said subwoofer, wherein said user at listening position 24 may evaluate whether a second blended subwoofer's output with the remainder of the system's speakers' output in the room is preferable to the output from any prior adjustment of said second control input 240 of said user-selected Phase Correction setting Phase Alignment Control system 222.

(14h) detecting a user's third adjustment of said second control input 240 of said user-selected Phase Correction setting Phase Alignment Control system 222, said user's third adjustment being a third selection from said at least four distinct user selectable Phase Correction settings which differs from said user's first and second adjustments, and, in response thereto, and then (14i) generating a third phase, polarity and amplitude adjusted audio signal 275 for said subwoofer, wherein said user at listening position 24 may evaluate whether a third blended subwoofer's output with the remainder of the system's speakers' output in the room is preferable to the output from any prior adjustment of said second control input 240 of said user-selected Phase Correction setting Phase Alignment Control system 222.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Figure 1C:
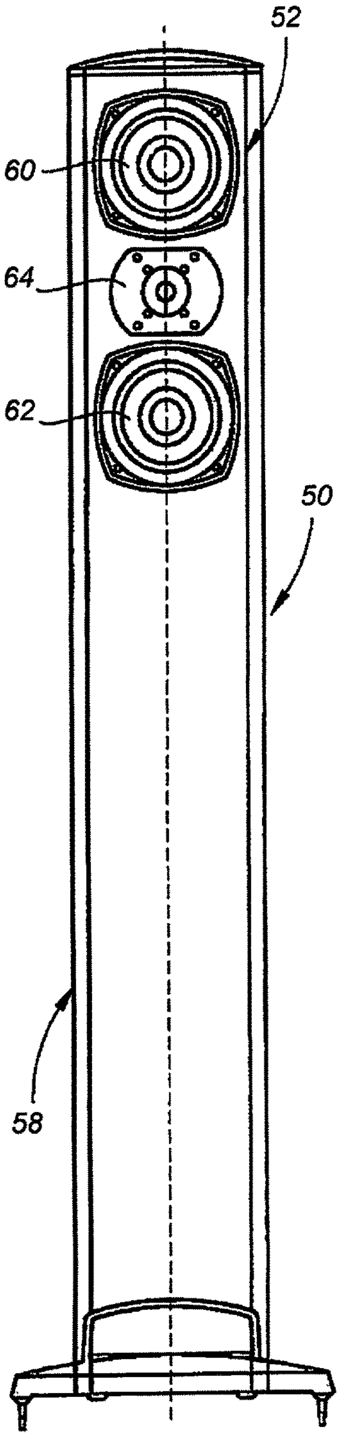
Fig. 1C (PRIOR ART)
FIG. 1C is a front view, in elevation, illustrating a large, tower shaped multi-driver loudspeaker system as typically employed as primary speakers in a home stereo or home theater system, in accordance with the prior art.
Figure 1D:
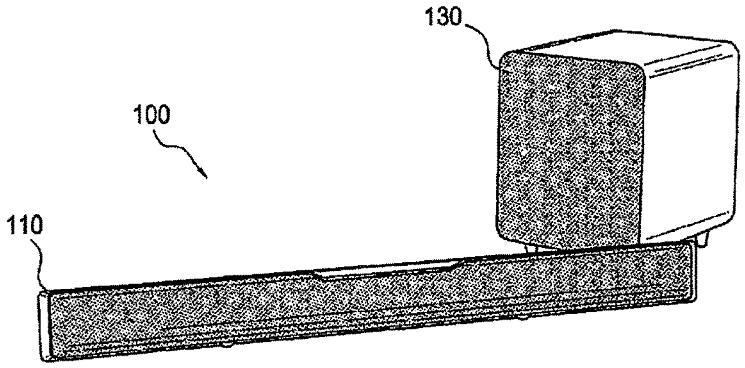
Fig. 1D (PRIOR ART)
FIG. 1D is a perspective view illustrating a popular home theater soundbar/subwoofer system, in accordance with the prior art.
Figure 1E:
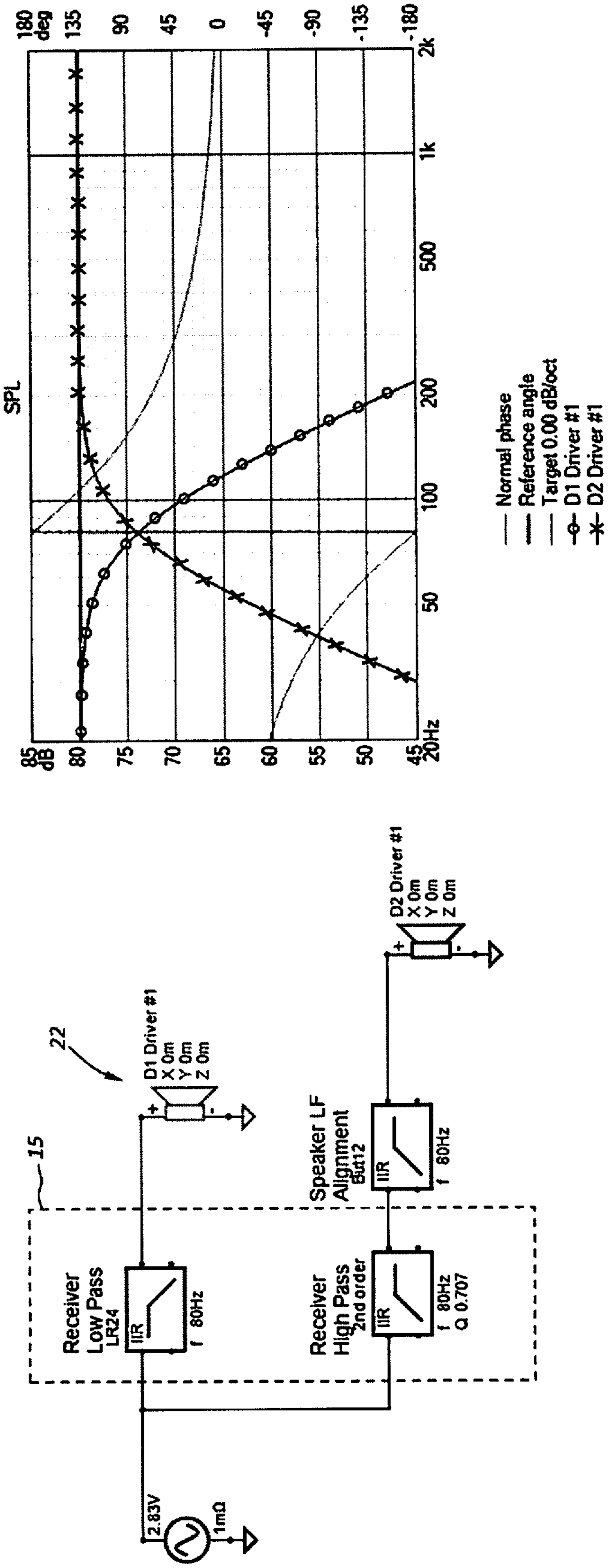
Fig. 1E (PRIOR ART)
FIG. 1E comprises a pair of diagrams illustrating the modelled behavior of crossover elements in typical home theater systems, in accordance with applicant's analysis of prior art systems.

While the system 200 and method of the presently described embodiment has been described using the example embodiments of FIGS. 2A-5, it can also be implemented (a) with full range speakers (e.g., like 50, of FIG. 1C) having integral active subwoofers, or (b) as part of an improved subwoofer soundbar system which externally resembles the system of FIG. 1D, possibly with one or more added improved subwoofers 222.

It will be appreciated that in certain embodiments, the look-up table in FIG. 5 could be simplified for certain input parameters, and possibly not interrogated in certain circumstances. For example, whether or not a polarity inversion needs to be applied can be determined by a binary test: if the phase correction setting is positive then the polarity is to be inverted; otherwise (i.e. if the phase correction setting is zero or negative) then no polarity inversion is required. Also, if the phase correction setting is −90° or +90° then the required tuning frequency for the all-pass filter is equal to the selected cut-off frequency value. Also, if the user-selectable phase correction setting is 0° or +180° then it can be decided that the all-pass filter can be bypassed without directly interrogating the matrix.

There may be benefit in providing an embodiment which provides for phase correction, by means of a user selecting a correction from a choice of different user-selectable phase correction settings, without providing the user control over selecting the cross-over frequency for the sub-woofer. The cross-over frequency could be fixed for example, so that it does not need to be (or is not able to be) varied by the user. Such an embodiment could utilize a much simplified version of the matrix shown in FIG. 5.

There may be benefit in providing an embodiment which provides for phase correction, by means of a user selecting a correction from a choice of different user-selectable phase correction settings, without the Phase Alignment Control system taking into account the cross-over frequency selected by the user for the sub-woofer. For example, there could be, say, twelve phase correction settings that include 0 and 180 degrees (bypassing the all-pass filter) and for the other ten to step through five different (but carefully selected) tuning frequencies of the all-pass filter, covering a range from 15 Hz to 360 Hz, say, at no polarity inversion and the other five covering a range from 15 Hz to 360 Hz with polarity inversion. This could provide the user with the possibility of having sufficient phase control for a crude correction for most, if not all, cross-over frequencies able to be selected.

The Phase Alignment Control system of the present invention as illustrated in FIGS. 2A-5 provides a surprisingly effective combination of features and method allowing the listener or user to blend or integrate the sound of a subwoofer 222 into the sound of a multi-speaker (e.g. home theater) system 200 in a user's room by focusing on efficient and effective digital signal processing to achieve, among other benefits, very short group delays in the subwoofer's signal output 250. A novel combination of adjusting phase control and polarity concurrently is employed to arrive at the user's desired phase correction or phase shift, in the listening room. It is also novel to change the tuning frequency of, preferably, a single first order all-pass filter based partly on the subwoofer's user-adjusted low pass filter frequency to derive the user's desired phase correction. These novel features are especially well suited for enabling the user, when in position 24 in their room, to make phase correction adjustments and minimize smearing or other adverse effects in the overall system's sound.

Having described embodiments of a new and improved method and system, it is believed that other modifications, variations and changes will be suggested to those skilled in the art in view of the teachings set forth herein. It is therefore to be understood that all such variations, modifications and changes are believed to fall within the scope of the present invention. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A phase alignment control system for a subwoofer, the phase alignment control system comprising:

at least four distinct user-selectable phase correction settings, the phase alignment control system configured to allow at least one of the distinct user-selectable phase correction settings to be selected at a time;

a single first-order all-pass filter having a selectable tuning frequency; and a polarity selection stage, wherein the phase alignment control system is configured such that selection of the selectable tuning frequency of the single first-order all-pass filter is at least partly in response to a subwoofer cross-over frequency and wherein the phase alignment control system is configured to:

generate an output signal by applying a phase change to an input signal in response to the at least one of the distinct user-selectable phase correction settings that has been selected, and apply the phase change to the input signal by a combination of (a) the single first-order all-pass filter causing the phase change as a result of selection of the selectable tuning frequency and (b) the polarity selection stage selectively applying, or not applying, a polarity inversion.

2. A phase alignment control system according to claim 1, wherein the phase alignment control system is configured such that in response to selection of the at least one distinct user-selectable phase correction setting corresponding to a desired change in phase angle of $X_1$ degrees, wherein the desired change in the phase angle is achieved by (a) the single first-order all-pass filter causing a phase change of Y degrees, and (b) the polarity selection stage applying the polarity inversion thus adding a 180 degree phase change, wherein a magnitude of the difference between $X_1$ and Y is 180 degrees.

3. A phase alignment control system according to claim 1, wherein the phase alignment control system is configured such that in response to selection of the at least one distinct user-selectable phase correction setting corresponding to a desired change in phase angle of $X_2$ degrees, wherein the desired change in the phase angle is achieved by (a) the single first-order all-pass filter causing a phase change of $X_2$ degrees, and (b) the polarity selection stage not applying the polarity inversion.

4. A phase alignment control system according to claim 1, wherein the phase alignment control system is configured such that in response to selection of the at least one distinct user-selectable phase correction setting corresponding to a desired change in phase angle of 180 degrees, the desired change in the phase angle is achieved by (a) the single first-order all-pass filter not causing a phase change, and (b) the polarity selection stage applying the polarity inversion.

5. A phase alignment control system according to claim 1, wherein the phase alignment control system is configured such that in response to selection of the at least one distinct user-selectable phase correction setting corresponding to a desired change in phase angle of 0 degrees, the desired change in the phase angle is achieved by (a) the single first-order all-pass filter not causing a phase change, and (b) the polarity selection stage not applying the polarity inversion.

6. A phase alignment control system according to claim 1, wherein the phase alignment control system is configured such that in response to selection of:

(i) a first user-selectable phase correction setting of the at least four distinct user-selectable phase correction settings corresponding to a first desired change in phase angle of $X_1$ degrees, wherein the first desired change in the phase angle is achieved by (a) the single first-order all-pass filter causing a phase change of Y degrees, and (b) the polarity selection stage applying the polarity inversion thus adding a 180 degree phase change, wherein a magnitude of the difference between $X_1$ and Y is 180 degrees;

(ii) a second user-selectable phase correction setting of the at least four distinct user-selectable phase correction settings corresponding to a second desired change in phase angle of $X_2$ degrees, wherein the second desired change in the phase angle is achieved by (a) the single first-order all-pass filter causing a phase change of $X_2$ degrees, and (b) the polarity selection stage not applying the polarity inversion;

(iii) a third user-selectable phase correction setting of the at least four distinct user-selectable phase correction settings corresponding to a third desired change in phase angle, namely of 180 degrees, wherein the third desired change in the phase angle is achieved by (a) the single first-order all-pass filter not causing a phase change, and (b) the polarity selection stage applying the polarity inversion; and (iv) a fourth user-selectable phase correction setting of the at least four distinct user-selectable phase correction settings corresponding to a fourth desired change in phase angle of 0 degrees, wherein the fourth desired change in the phase angle is achieved by (a) the single first-order all-pass filter not causing a phase change, and (b) the polarity selection stage not applying the polarity inversion.

7. A phase alignment control system according to claim 1, wherein:

at least a first distinct user-selectable phase correction setting of the at least four distinct user-selectable phase correction settings is in the range of −10 to +100 degrees, at least a second distinct user-selectable phase correction setting of the at least four distinct user-selectable phase correction settings is in the range of +80 to +190 degrees, at least a third distinct user-selectable phase correction setting of the at least four distinct user-selectable phase correction settings is in the range of +10 to −100 degrees, and at least a fourth distinct user-selectable phase correction setting of the at least four distinct user-selectable phase correction settings is in the range of −80 to −190 degrees.

8. A phase alignment control system according to claim 1, wherein there are (a) eight or more and (b) 24 or fewer of the distinct user-selectable phase correction settings.

9. A phase alignment control system according to claim 1, wherein the phase alignment control system is configured such that the selectable tuning frequency of the single first-order all-pass filter is selected in response to the subwoofer cross-over frequency and selection of the distinct user-selectable phase correction settings, and wherein for a first sub-set of the distinct user-selectable phase correction settings the tuning frequency selected is less than the subwoofer cross-over frequency and for a second sub-set of the distinct user-selectable phase correction settings the tuning frequency selected is more than the subwoofer cross-over frequency.

10. A phase alignment control system according to claim 1, further comprising an adjustable amplifier gain stage.

11. A phase alignment control system according to claim 1, wherein the phase alignment control system is integrated in or on a subwoofer.

12. A phase alignment control system according to claim 1, further comprising a user display device configured to display which of the distinct user-selectable phase correction settings is selected.

13. A phase alignment control system according to claim 12, wherein the user display device is also configured to allow the user to select a desired user-selectable phase correction setting.

14. A phase alignment control system according to claim 12, wherein the user display device is a remote device.

15. A subwoofer comprising a phase alignment control system according to claim 1 integrated into the subwoofer.

16. A multi-speaker home theater system comprising:

a phase alignment control system according to claim 1; and a subwoofer driven in dependence on the output signal from the phase alignment control system.

17. A phase alignment control system according to claim 1, wherein the at least four distinct user-selectable phase correction settings include eight distinct user-selectable phase correction settings at evenly spaced phase increments.

18. A phase alignment control system according to claim 17, wherein the eight distinct user-selectable phase correction settings include −135 degrees, −90 degrees, −45 degrees, zero degrees, +45 degrees, +90 degrees, +135 degrees, and +180 degrees.

19. A phase alignment control system for a subwoofer, the phase alignment control system comprising:

at least four distinct user-selectable phase correction settings, the phase alignment control system configured to allow at least one of the distinct user-selectable phase correction settings to be selected at a time;

a single first-order all-pass filter having a selectable tuning frequency; and a polarity selection stage, wherein the phase alignment control system is configured to:

automatically select the selectable tuning frequency of the single first-order all-pass filter in response to a user-selectable subwoofer cross-over frequency and the user-selectable phase correction settings, generate an output signal by applying a phase change to an input signal in response to the at least one of the distinct user-selectable phase correction settings that has been selected, and apply the phase change to the input signal by a combination of (a) the single first-order all-pass filter causing the phase change as a result of selection of the selectable tuning frequency and (b) the polarity selection stage selectively applying, or not applying, a polarity inversion.

20. A phase alignment control system according to claim 19, wherein the phase alignment control system is configured such that selection of the selectable tuning frequency of the single first-order all-pass filter includes interrogating a look-up table stored in a memory device, the look-up table providing tuning frequency values for different combinations of values of subwoofer cross-over frequencies and the distinct user-selectable phase correction settings.

21. A phase alignment control system according to claim 19, wherein the phase alignment control system is configured such that selection of the selectable tuning frequency of the single first-order all-pass filter is at least partly in response to the user-selectable subwoofer cross-over frequency in a frequency range from 40 Hertz to 150 Hertz in a selected plurality of evenly spaced frequencies.

22. A phase alignment control system according to claim 21, wherein the phase alignment control system is configured such that selection of the selectable tuning frequency of the single first-order all-pass filter is at least partly in response to the user-selectable subwoofer cross-over frequency selected from the following evenly spaced frequencies: 40 Hz, 45 Hz, 50 Hz, 55 Hz, 60 Hz, 65 Hz, 70 Hz, 75 Hz, 80 Hz, 85 Hz, 90 Hz, 95 Hz, 100 Hz, 105 Hz, 110 Hz, 115 Hz, 120 Hz, 125 Hz, 130 Hz, 135 Hz, 140 Hz, 145 Hz and 150 Hz.

23. A phase alignment control system according to claim 19, wherein the phase alignment control system is configured to select a tuning frequency $f_0$ that is automatically set to be equal to the user-selectable subwoofer cross-over frequency when the user-selectable phase correction setting is-90 degrees or +90 degrees.

24. A phase alignment control system according to claim 19, wherein the phase alignment control system is configured to automatically bypass the all-pass filter when the user-selectable phase correction setting is zero degrees or 180 degrees.

25. A phase alignment control system according to claim 19, wherein the at least four distinct user-selectable phase correction settings include eight distinct user-selectable phase correction settings at evenly spaced phase increments.

* * * * *